United States Patent Office 3,510,208
Patented May 5, 1970

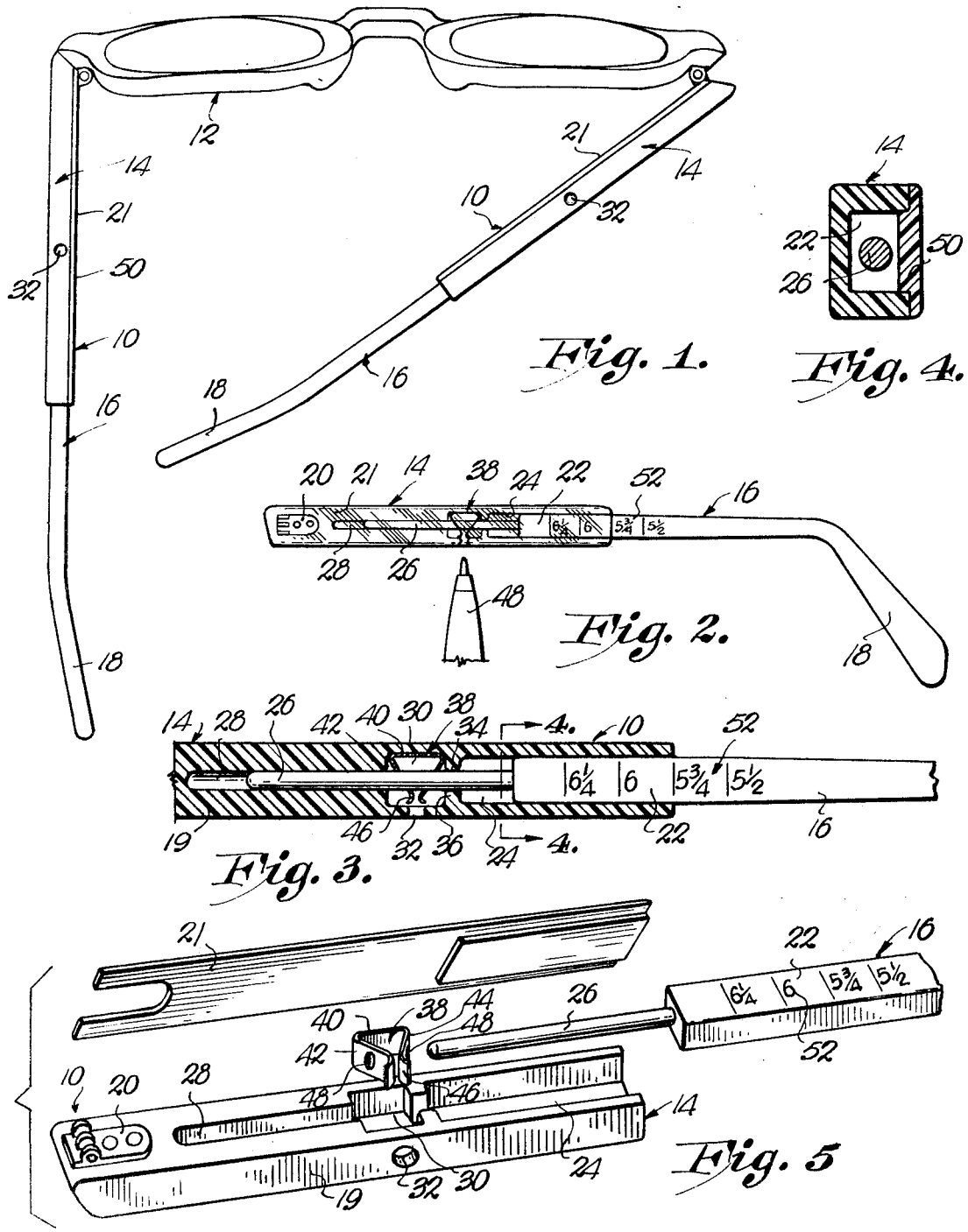

3,510,208
EXTENSIBLE TEMPLES FOR SPECTACLES
Willis T. Watkins, Hickman Mills, Mo., assignor to Parmelee Plastics Company, Kansas City, Mo., a corporation of Missouri
Filed Sept. 24, 1968, Ser. No. 761,990
Int. Cl. G02c 5/20
U.S. Cl. 351—118        2 Claims

ABSTRACT OF THE DISCLOSURE

An extensible temple for spectacles has two telescoping sections locked against reciprocation by a spring clip. The clip is housed within one of the sections and has gripping elements which may be released by inserting a tool through an opening in the temple piece when it is desired to change the temple length. An alternative form utilizes a clip having leg elements extending through openings in the temple piece which may be moved toward each other to release their grip.

---

This invention relates to an improved temple piece for spectacles. The term spectacles as used herein shall include eyeglasses with or without corrective lenses, goggles, and other protective devices for the eyes.

Extensible temple pieces are desirable on safety spectacles since they are commonly worn by a number of wearers, and also to reduce the inventory that companies must carry to fit all their employees. Prior art temple pieces have been proposed that are shiftable to a finite number of positions, but in order to fit the largest possible number of wearers the temples must not be so limited.

An important object of this invention is to provide a temple piece that is capable of fitting virtually every user. This is accomplished by providing a unique releasable clip arrangement engaging one of two telescoping sections to lock them together to form a unitary temple piece. Upon release of the clip the length of the temple piece may be changed.

Another important object of this invention is to increase the durability of the temple pieces. This is achieved by mounting the clip entirely within one of the temple pieces. In the preferred form of the present invention, a tool must be inserted into one of the sections to release the clip, and each clip is flexed but once for each change of length. The clips are thus less likely to fail from flexure than if they were more easily actuated.

Another object of the invention is the provision of an infinitely adjustable extensible temple for eyeglasses which is not only economical to manufacture but also is capable of withstanding abuse during normal use by virtue of the fact that a standard molded synthetic resin temple is used having a reinforcing wire therein and the outer end of this wire projecting from the plastic part of temple is telescoped into a passage therefor presented in a molded hinge element which also houses the wire-engaging clip permitting adjustment of the effective length of the temple.

In the drawings:

FIG. 1 is a bottom plan view of a pair of eyeglasses showing the improved temple piece of my present invention;

FIG. 2 is a side elevation of the temple piece with the cover plate removed;

FIG. 3 is an enlarged, fragmentary, longitudinal, sectional view through the temple piece;

FIG. 4 is a cross-sectional view taken along line 4—4 of FIG. 3 still further enlarged;

FIG. 5 is a fragmentary, exploded view showing details of the assembly; and

FIG. 6 is a view similar to FIG. 3 showing an alternate form of the invention.

In FIGS. 1–5, the improved temple 10 of my present invention for spectacles 12 is rendered extensible by provision of telescopically interconnected, relatively shiftable sections including an outer section 14 and an inner section 16. For brevity only one temple 10 is shown and described in detail since both are the same except being constructed for right or left sides of the spectacle frame 12. The section 16 comprises an L-shaped element molded of relatively high strength impact resistant synthetic resin material reinforced with an elongated wire or rod 26 which extends from the ear piece portion 18 thereof to the opposite end of section 16 and projects longitudinally therefrom as is evident in FIGS. 2–6. Section 14 is also molded of synthetic resin material similar to that from which section 16 is constructed and is made up of a main element or member 19 having an irregular channel molded in one major face thereof, and a relatively flat cover member 21 normally closing the channel in member 19. Hinge piece 20 carried by member 19 at the end thereof opposite temple section 16 pivotally joins temple 10 to spectacle frame 12.

Transversely polygonal length 22 of section 16 fits within the portion of the channel in member 19 defining a complementally-shaped recess 24 at one end of section 14, as does the portion of elongated rod 26 which projects outwardly from length 22. Rod 26 fits within complemental cylindrical bore 28 formed in member 19 of section 14 adjacent piece 20. Rod 26 traverses cavity portion 30 of the channel in section 14 located between recess 24 and bore 28. Opening 32 in member 19 provides access to cavity 30. Rod 26 also passes through a port 34 in a partition 36 of member 19 between recess 24 and cavity 30.

Releasable structure for holding the sections 14 and 16 against reciprocation relatively along their longitudinal axis includes a generally U-shaped clip 38 of resilient material housed within the cavity 30 and receiving the rod 26 within the legs thereof.

The clip 38 has a bight 40 and a pair of legs 42 and 44 which diverge as bight 40 is approached. Legs 42 and 44 terminate in outturned lips 46 which present an entrance mouth therebetween aligned with opening 32 and adapted to receive a pointed instrument 48 such as the end of a conventional ball-point pen which may be inserted into opening 32. Rod 26 passes through aligned apertures 48 in legs 42 and 44. The member 21 which covers recess 24, bore 28 and of cavity 30 is adhesively or otherwise secured to member 19 after insertion of the assembly of rod 26 and clip 38 in the channel in member 19.

The angularity between the legs 42 and 44 is such as to normally grip the rod 26 and thereby prevent in-and-out movement of the section 16 so as to hold the latter in selected positions relative to section 14. The overall length of the temple 10 can easily be determined by indicia 52 of conventional length designation on the inner face of section 16. Such length of the extensible temple 10 may, however, be quickly and easily varied to comfortably fit the head of the wearer by simply inserting the pen end of instrument 48 between the lips 46 through opening 32 so as to spread the legs 42 and 44 apart, releasing their grip on rod 26 at apertures 48. The section 16 may then be shifted in or out whereupon, after removal of instrument 48, the legs 42 and 44 by their inherent resiliency automatically regrip the rod 26 to hold the section 16 in its selected position. The opening 32 is deliberately sized to receive the tip of a conventional ball-point pen since these instruments are virtually universally available, and have a curved outer end for effectively spreading the adjacent ends of legs 42 and 44. The outturned lips 46 facilitate insertion of the tip end of instrument 48 between legs 42 and 44.

In the embodiment of FIG. 6 temple 110 has a section 114 and a section 116, the latter of which is in all respects identical with section 16. Section 114 is likewise identical with section 14 except that its cavity 130 has a pair of openings 132a and 132b.

Clip 138 is generally U-shaped presenting a bight 140 and a pair of legs 142 and 144. Legs 142 and 144 extend through openings 132a and 132b respectively and are provided with apertures 148 which receive rod 126 of section 116. The grip of legs 142 and 144 on rod 126 at apertures 148 is released by pressing the legs 142 and 144 at their terminal ends toward each other. Since the outer ends of legs 142 and 144 project from section 114, they may be readily grasped and moved toward each other to release the respective rod 126.

Any suitable means (not shown) may be provided for limiting the extent of outward movement of sections 16 and 116, such as through use of interengaging stops on rods 26 and 126 and in bores 28 and 128 respectively.

In each instance, clips 38 and 138 provide for infinite extensibility within fine limits and the grip on rods 26 or 126 is positive with no danger of slippage. The extensible temples 10 and 110 are easily and inexpensively manufactured, and have a minimum number of parts, all of which are long lasting and not subject to breakage or inoperability even after long periods of continued use.

Having thus described the invention, what is claimed as new and desired to be secured by Letters Patent is:

1. A temple for spectacles comprising: a pair of elongated temple sections interconnected for reciprocation relatively along their longitudinal axis; and releasable structure for holding said sections against relative reciprocation, said structure including a releasable clip of resilient material carried by one of the sections, said clip having a pair of elements yieldably biased toward a position gripping the other of said sections, said other section being telescoped within said one section, said one section having a clip-receiving cavity for holding the clip against reciprocation with respect to the one section when in gripping relationship to the other section, said clip being U-shaped, presenting a bight and a pair of legs movable toward and away from each other, said legs having apertures whose walls normally bind on and grip said other section, said one section having an opening aligned with the legs of the clip adapted to receive a member for spreading the legs apart to release their grip on said other section.

2. A temple for spectacles comprising; a pair of elongated temple sections interconnected for reciprocation relatively along their longitudinal axis; and releasable structure for holding said sections against relative reciprocation, said structure including a releasable clip of resilient material carried by one of the sections, said clip having a pair of elements yieldably biased toward a position gripping the other of said sections, said other section being telescoped within said one section, said one section having a clip-receiving cavity for holding the clip against reciprocation with respect to the one section when in gripping relationship to the other section, said clip being V-shaped, presenting a bight and a pair of legs movable toward and away from each other, said legs having apertures whose walls normally bind on and grip said other section, said one section having openings through which said legs extend exteriorly of said one section, whereby the legs may be moved toward each other to release their grip on said other section.

References Cited

UNITED STATES PATENTS 1,505,220  8/1924  Shay _____ 24—243

FOREIGN PATENTS 1,358,532  3/1964  France.

DAVID SCHONBERG, Primary Examiner

J. W. LEONARD, Assistant Examiner

U.S. Cl. X.R.

351—140; 24—257, 115; 287—58